A. A. DENNIS.
PNEUMATIC TIRE.
APPLICATION FILED JULY 20, 1912.
1,109,970.
Patented Sept. 8, 1914.
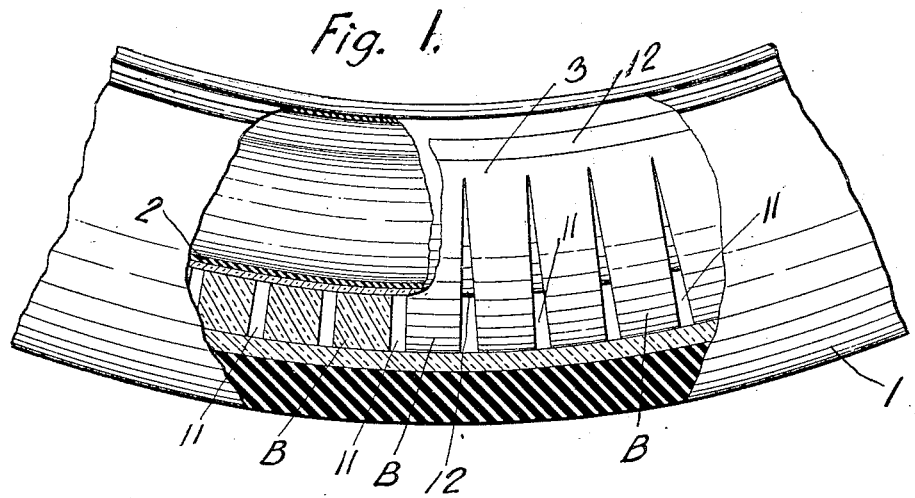
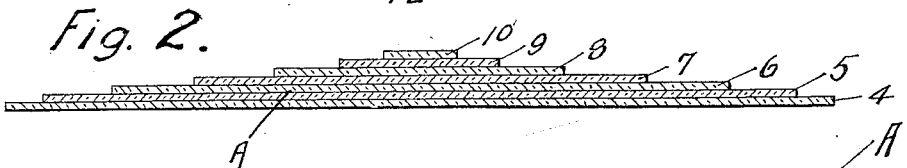
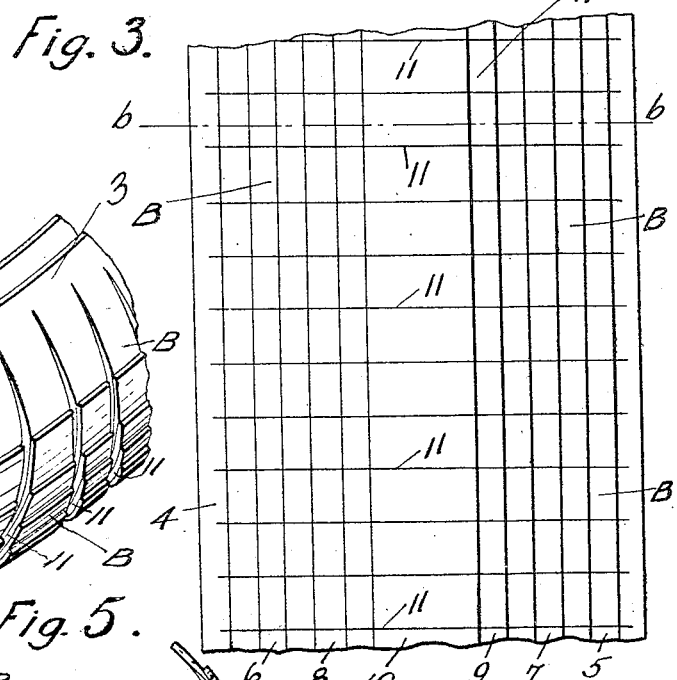
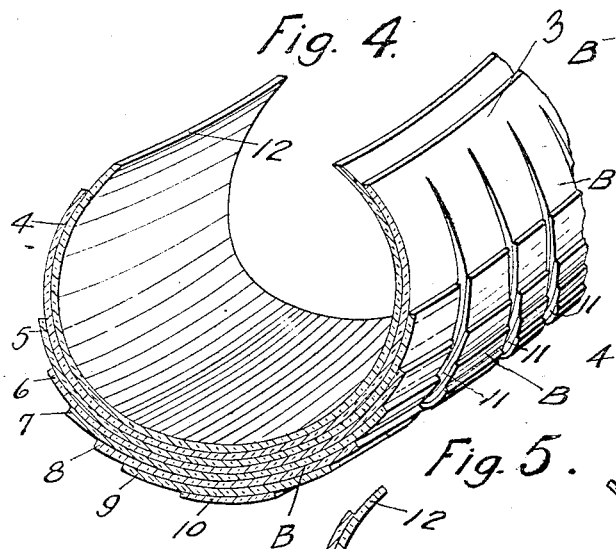
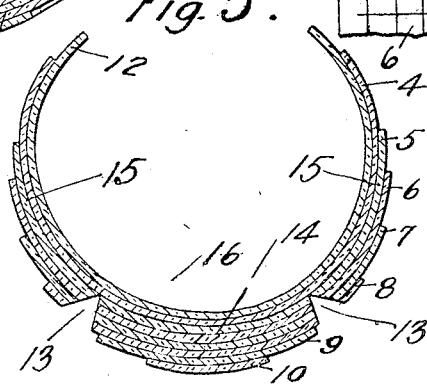
WITNESSES:
Albert A. Frey.
A. P. Hayes
INVENTOR
Alfred A. Dennis
BY
Chas. J. Williamson
ATTORNEY

UNITED STATES PATENT OFFICE.

ALFRED A. DENNIS, OF GRAND RAPIDS, MICHIGAN.

PNEUMATIC TIRE.

1,109,970.

Specification of Letters Patent.

Patented Sept. 8, 1914.

Application filed July 20, 1912. Serial No. 710,647.

*To all whom it may concern:*

Be it known that I, ALFRED A. DENNIS, a citizen of the United States, and resident of Grand Rapids, in the county of Kent and the State of Michigan, have invented a certain new and useful Improvement in Pneumatic Tires, of which the following, taken in connection with the accompanying drawings, is a specification.

The object of my invention in the broadest view is to diminish to the utmost the danger of punctures and blow outs with little or no alteration in the tire structure from standard or accepted forms as far as the matter of the air tube and outer casing is concerned, and without impairment of the resilient, or elastic, or cushioning properties of the tire, and in particular my object is to provide an embodiment of my invention in the form or nature of an attachment capable of easy and convenient application to the tire structure, and for the attainment of my objects, my invention consists in the tire structure and the attachment having the characteristics substantially as hereinafter specified and claimed.

Figure 1 is a view in side elevation, with parts in section illustrating my invention; Fig. 2 is a section on line *b—b*. Fig 3; Fig. 3 is a plan view of what is shown in Fig. 2; Fig. 4 is a detail view in perspective showing the main features of the invention; Fig. 5 is a cross section of the auxiliary casing or attachment as I prefer to construct it.

As shown in the drawings, the tire in respect to the outer casing 1 and the rim to which such casing is attached and the inner or air tube 2 is of the usual and ordinary accepted construction. And as shown in Fig. 1 I interpose between the air tube and the outer casing toward the outer or tread side of the tire a series of blocks B which are joined together in a circumferential direction so as to be normally spaced apart or separated circumferentially. The novel construction of the blocks and manner in which they are made and secured together comprise the essential features of my invention.

Referring to the drawings it will be seen that I provide a plurality of strips 4, 5, 6, 7, 8, 9, and 10, of tire fabric, the strips being of varying widths but of the same length which is sufficient when fashioned into the auxiliary casing to entirely receive the air tube 2. The strips are placed one above another and cemented, vulcanized, or otherwise securely fastened together, with the widest strip 4 at the bottom, strip 5 next in width above strip 4, terminating finally with the narrowest strip 10 at the top, as shown in Figs. 2 and 3, and forming in effect a long solid strip of fabric, which I have denoted as a whole by letter A, and having a cross-section approximating an isosceles triangle, thickest at the center and tapering toward the side edges as best shown in Fig. 2. Of course, it is clear that for purposes of illustration of the construction, it is necessary to magnify the thickness of the strips 4, 5, 6, 7, 8, 9, and 10, and show a less number of strips than actually used, the actual construction taking a large number of thin tire fabric strips, and not having the rough stepped surfaces to such an exaggerated extent as shown.

After the thin strips have been fastened together to form one solid fabric strip A, as explained, a series of spaced cuts 11 are made transversely therethrough, extending entirely through the fabric but terminating a short distance from each edge thereof as shown in Fig. 3. The effect of the cuts is to divide the strip A into a series of short sections B having thickened centers and tapering sides, and connected together in a continuous series at their outer edges.

The series of connected sections B formed as described, are attached to a form or shoe 12, also of tire fabric, canvas, or other equivalent material. Shoe 12, is laid over and fitted to a form to make an open-sided hollow member adapted to receive and partially inclose the air tube 2 and the connected sections B placed on shoe 12 with the widest strip 4 in contact therewith, are securely attached thereto while it is on the form. When the sections B are attached to shoe 12, it will be apparent that the circumferential curvature that the shoe 12 must have in order to form a tube inclosure, will cause the sections to space themselves apart at their outer edges, widening the cuts 11 in such manner that they will taper from the thick centers of the sections toward the narow sides thereof; while the bending of the sections to conform to the outer surface or periphery of the shoe will form each section into an approximately crescent shaped block as shown in Fig. 4.

As shown in Fig. 5, the strip of fabric A, may also be cut lengthwise thereof as at 13 before attachment to shoe 12. While I have indicated two such cuts, the number may be varied at will. In actual practice, however, it appears best to locate a cut 13 at each side of the longitudinal center of the fabric strip A such distance that when the sections B are formed into crescents as shown in Fig. 5, and placed within the outer casing the openings formed at cuts 13 will be approximately opposite the bending points of the outer casing as it is flattened in sustaining the weight of the car, or in passing over rough and uneven surfaces. The cuts 13 extend nearly but not entirely through the fabric strip A as shown and divide each section or block B into what may be termed a central body portion 14 and a pair of upwardly projecting tapering wings 15 attached and for all practical purposes hinged thereto.

From this description of the construction of the auxiliary casing it will be seen that when it is applied to a tire and incloses the inner tube thereof there is provided, between the air tube and outer casing, a circumferentially extending series of spaced apart or separated blocks, which are joined together in circumferential direction, separating the air tube a substantial distance from the outer casing and practically insuring against blow outs and punctures from penetrating objects, both by reason of the greater distance of the air tube from the roadway and because of the protection afforded by the auxiliary casing itself which is of material and structure to serve such purpose. And at the same time there is no impairment of the cushioning action of the tire, nor any detrimental effect on the tire by reason of the auxiliary casing. By virtue of the spacing apart and the flexible connection of sections or blocks B, when any portion of the tire is under stress either from the ordinary weight of the car or from rough and uneven roads, obstructions, projections, etc., only the section or sections in the immediate vicinity of the stress are affected and they readily yield with the tire without producing the hard and deadening effect that would occur from a solid or substantially solid auxiliary inclosure. And in this connection the importance of the cuts 13 from the standpoint of practical utility will appear. When the outer casing is flattened at any portion of its circumference by reason of any force applied thereto, it is clear that that portion of the outer casing opposite the rim of the wheel will be forced toward the rim while the sides of the tire adjacent the flattened tread will have comparatively little or no movement. This will cause a bending between each side and the tread of the casing. By locating the cuts 13 of the sections or blocks B in the immediate vicinity where such bendings occur, it will be seen that while movement of the tread toward the rim will move the body portion 14 of the adjacent section also, such movement of part 14 will not cause any similar or corresponding movement of the side wings 15, as they are practically merely hinged to the body portion and will remain relatively at rest with respect to the body portion and in contact with the relatively stationary sides of the outer casing. By this means there is practically assured no friction or wearing whatever between the outer casing 1 and the sections or blocks B of the auxiliary casing or attachment and there is no diminution or impairment of the cushioning action of the tire. By making the cuts 13 there is also provided a connection between the spaces between the spaced apart blocks B, allowing a circulation of the air in such spaces tending to increase the cushioning action of the tire and also cooling the tire when warmed during fast driving.

Having thus described my invention what I claim is:—

1. A guard and support for pneumatic tires comprising a hollow circumferentially and peripherally curved shoe and a strip centrally thickened between the side edges thereof, said strip being transversely cut from adjacent one side edge to adjacent the other side edge but leaving the side edges for a short distance inwardly uncut, said cuts occurring at spaced apart intervals in the length of said strip, and the said strip being secured on the outer surface of the shoe, substantially as and for the purpose set forth.

2. A guard and support for pneumatic tires comprised of a hollow circumferentially and peripherally curved shoe and a strip formed of a built up series of superposed layers of fabric material, said layers of fabric material decreasing in width with each layer whereby there is formed a strip centrally thickened between the side edges thereof, a series of transverse cuts being made in said strip from adjacent one side edge of the strip to adjacent the other side edge thereof but terminating short of the side edges, and said strip being secured to the shoe on the outer side thereof substantially as described.

In testimony whereof I have hereunto set my hand.

ALFRED A. DENNIS.

Witnesses:
ALBERT A. FREY,
CHAS. J. WILLIAMSON.